United States Patent
DePetris et al.

(10) Patent No.: US 8,156,023 B2
(45) Date of Patent: Apr. 10, 2012

(54) INCENTIVE STRUCTURE FOR CENTRALIZED TRADING MARKET

(75) Inventors: Gregory Wayne DePetris, Guilford, CT (US); Martin Rein Hakkar, Northport, NY (US); Thomas Walter Little, Jr., Hoboken, NJ (US); Sergei Poliakoff, New York, NY (US)

(73) Assignee: Automated Equity Finance Markets, Inc., New York, NY (US)

( * ) Notice: Subject to any disclaimer, the term of this patent is extended or adjusted under 35 U.S.C. 154(b) by 819 days.

(21) Appl. No.: 12/217,456

(22) Filed: Jul. 2, 2008

(65) Prior Publication Data

US 2010/0004985 A1    Jan. 7, 2010

(51) Int. Cl.
*G06Q 40/00* (2012.01)

(52) U.S. Cl. ............................ 705/35; 705/36 R; 705/37

(58) Field of Classification Search ............... 705/14.53, 705/14.49, 37, 80, 36 R, 35, 5; 706/52
See application file for complete search history.

(56) References Cited

U.S. PATENT DOCUMENTS

| | | | |
|---|---|---|---|
| 6,618,707 | B1 | 9/2003 | Katz |
| 2008/0052214 | A1 * | 2/2008 | Martinez et al. ................. 705/37 |
| 2009/0055305 | A1 * | 2/2009 | Hirani et al. ..................... 705/37 |
| 2010/0268605 | A1 * | 10/2010 | Waelbroeck et al. ...... 705/14.53 |

OTHER PUBLICATIONS

D'Avolio, "The market for borrowing stock", *J. Fin'l Economics* 66 (2002) pp. 271-306, Elsevier.

\* cited by examiner

*Primary Examiner* — Behrang Badii
(74) *Attorney, Agent, or Firm* — Brenda Pomerance

(57) ABSTRACT

An automated marketplace is separated into tiers, with behavioral requirements for each tier. Tier eligibility is a "structural incentive" for market participants to exhibit desirable behavior and eschew undesirable behavior. Tiered eligibility also reflects the natural imbalance of liquidity in the market and the need to preserve the identity of a class of liquidity providers, which further leads to a structure that can preserve the integrity of person-to-person trading relationships even in an automated environment. Within each tier, participant behavior leads to a ranking for that participant. When specific events occur, these events are allocated based on participant ranking. Participant ranking is an "activity incentive" that influences the behavior of market participants. Certain events are defined as desirable or undesirable, and when performed by a market participant, lead to positive incentives or negative incentives, of structural and/or monetary type.

4 Claims, 10 Drawing Sheets

X: Cash Collateral $103
Z: Interest on Cash Collateral $zz
Y: Securities Loan $100

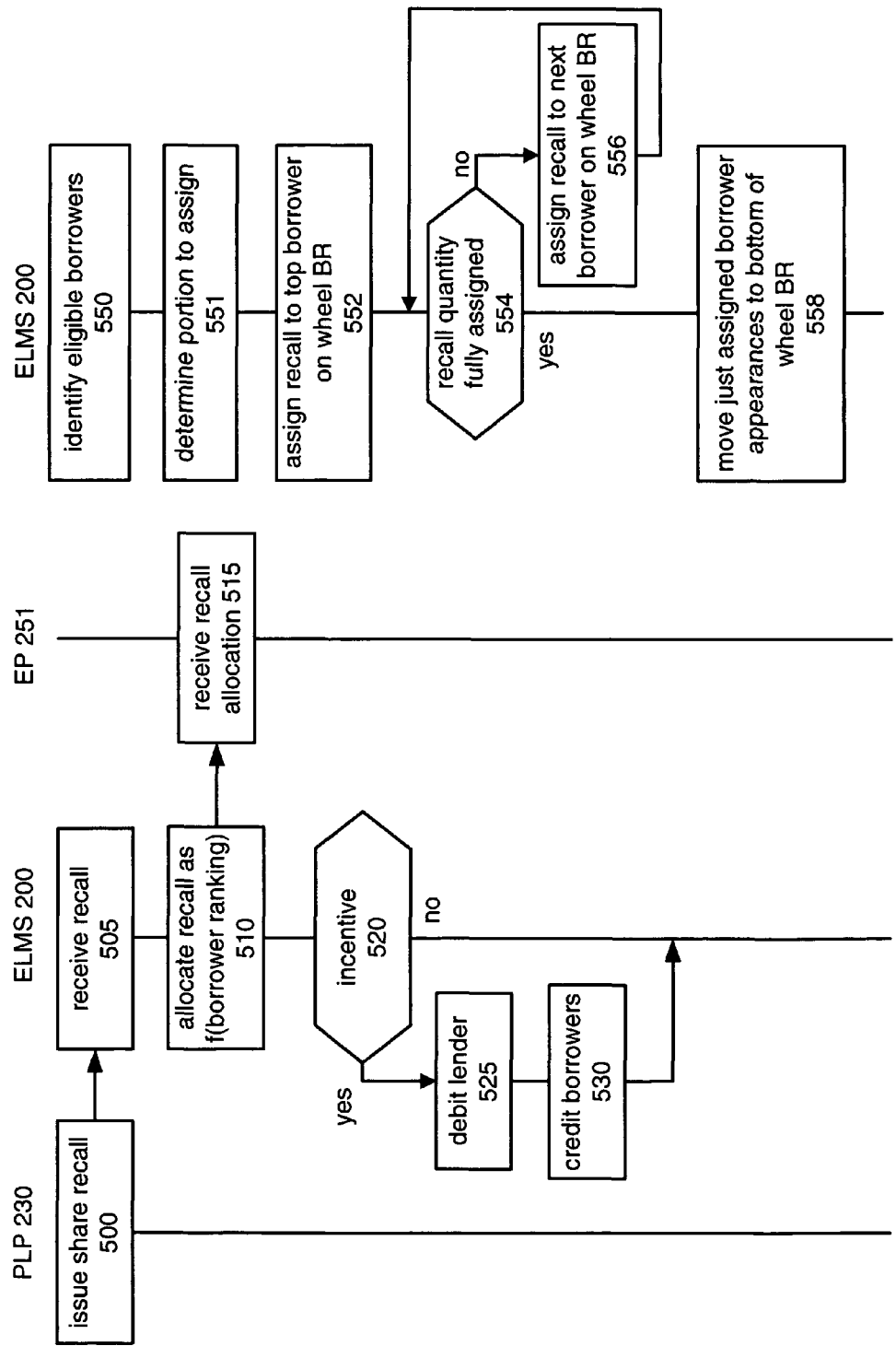

INCENTIVE STRUCTURE FOR CENTRALIZED TRADING MARKET

BACKGROUND OF THE INVENTION

The present invention relates to structural incentives, activity incentives and economic incentives for participants in a centralized trading market.

Externalities occur when one person's actions affect another person's well-being and the relevant costs and benefits are not reflected in market prices. Externalities can be positive, providing benefits, or negative, providing harms.

Automation of a financial market has historically been difficult when the financial instruments are highly illiquid or have naturally imbalanced supply and demand. Thus, these markets remain dependent on person-to-person trading, usually conducted via the telephone or instant messaging. Market participants are resistant to losing the benefits of person-to-person trading relationships.

When transitioning from a market premised on participants' knowledge of each other, to an automated market where participants participate anonymously, the behavior incentives due to personal relationships are no longer available. Accordingly, to operate effectively, automated incentives should take the place of the incentives implicit in the personal relationships.

In newly automated markets, there is a need for automated incentives to promote good behavior and discourage bad behavior.

SUMMARY OF THE INVENTION

In accordance with an aspect of this invention, there is provided a method of allocating an event among a set of market participants, automatically by a software program executing on a computer. A subset of eligible market participants is determined from the set of market participants. One of the eligible market participants is selected in accordance with rankings of the subset of eligible market participants, and the event is allocated to the selected eligible market participant.

In some embodiments, the market participants are stock borrowers and stock lenders. When the event is a request for a new stock loan by a borrower, and the determining includes identifying lenders offering to lend shares of the stock. When the event is a return of shares for an existing stock loan, the stock having a symbol, the determining includes identifying lenders who have outstanding stock loans for the symbol. When the event is a recall of shares for an existing stock loan, the stock having a symbol, the determining includes identifying borrowers who have outstanding stock loans for the symbol.

In accordance with another aspect of this invention, there is provided a method of assigning a financial incentive for an action having an actual characteristic to a market participant, by a software program executing on a computer. A threshold characteristic associated with a type of the market participant is retrieved, the type being based on the activity of the market participant during a specified time period. The actual characteristic is compared with the threshold characteristic to decide whether a financial incentive has been earned, and if earned, a value for the financial incentive is determined. The determined value of the financial incentive is assigned to the market participant.

In accordance with another aspect of this invention, there is provided a method of determining a ranking of a market participant in a market separated into tiers, automatically by a software program executing on a computer, where market participants are eligible to participate in respective tiers based on their behavior. The behavior of a market participant is compared to tier-normal behavior, and a report is produced when the participant is outside the tier-normal behavior.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 10A-10B are a flowchart showing automated incentives for a lender.

DETAILED DESCRIPTION

Figure 1:
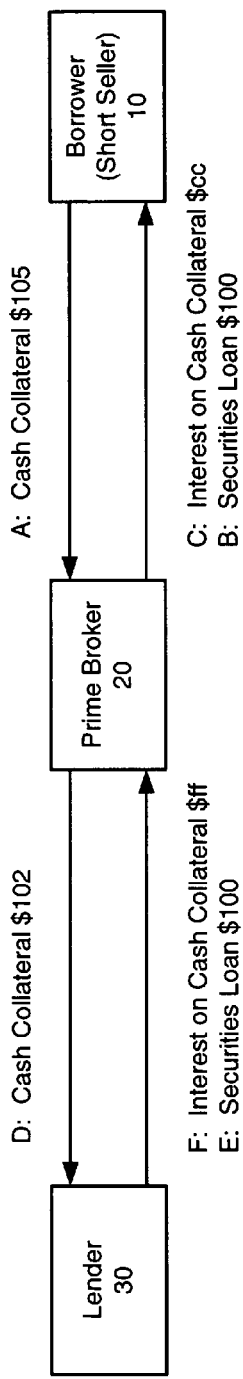
FIG. 1 is a block diagram showing the conventional relationships between a borrower, a lender and a prime broker for a securities loan.

Finding ways to affect trading programs in similar manner as relationships affect person-to-person trading is important as demands for "transparency" increase which in turn place scrutiny on person-to-person trading.

Desirable behavior refers to activity that leads to a marketplace with desirable characteristics such as deeper liquidity, smaller buy-sell quote spreads, reduced systemic risk and more equitable access for market participants. Undesirable behavior leads away from a marketplace with desirable characteristics. Undesirable behavior also includes using the marketplace only for price discovery ("gaming" or "bypass") with intent to execute in another marketplace. In particular, gaming behavior is characterized by chronic sending of orders to the marketplace, determining as much price information as possible, then cancelling the orders generally to the detriment of other market participants.

An automated marketplace is separated into tiers, with behavioral requirements for each tier. Tier eligibility is a "structural incentive" for market participants to exhibit desirable behavior and eschew undesirable behavior. Tiered eligibility also reflects the natural imbalance of liquidity in the market and the need to preserve the identity of a class of liquidity providers, which further leads to a structure that can preserve the integrity of person-to-person trading relationships even in an automated environment.

Within each tier, participant behavior leads to a ranking for that participant. When specific events occur, these events are allocated based on participant ranking. Participant ranking is an "activity incentive" for market participants to exhibit good behavior and eschew bad behavior.

Certain events are defined as desirable or undesirable, and when performed by a market participant, lead to positive incentives or negative incentives, of structural and/or monetary type. Incentives encourage market participants to exhibit good behavior and eschew bad behavior.

Automated structural, activity and economic incentives will now be discussed in the context of the securities lending marketplace. Use of incentives is not limited to securities lending. Incentives are useful in a wide variety of situations such as pollution rights trading, derivative financial markets that provide liquidity rebates (ex: ISE, ARCA) and so on.

Incentives are not limited to the disclosed types of incentives.

The conventional U.S. securities lending marketplace will now be discussed.

A normal or "long" sale is the sale of a security that the seller presently owns.

A "short" sale is the sale of a security that the seller does not own or any sale that is consummated by the delivery of a security borrowed by, or for the account of, the seller. Usually, a short seller expects the market price for a security to decrease; a short seller sells now, expecting to buy at a lower price in the future to close out her position. This is a profitable strategy when it achieves the sequence of sell high then buy low. The ease of short selling is crucial for effective arbitrage. Short sellers generally do not know how long they will maintain their position.

Short sellers include hedge funds, mutual funds (if permitted by the rules of the fund), institutional investors, retail investors, brokers trading for their own account, arbitrageurs, market makers, risk managers, speculators, and so on.

The major reason that someone wants to borrow securities is to accomplish a short sale in compliance with the Securities and Exchange Commission (SEC) regulations. Specifically, SEC Regulation SHO requires short sellers in all equity securities to locate securities to borrow before selling, see http://www.sec.gov/rules/final/34-50103.htm. Other reasons for borrowing securities, referred to as "permitted purposes" under Regulation T of the Board of Governors of the Federal Reserve System, include (i) to prevent a settlement failure, and (ii) for establishing an Exchange Traded Fund (ETF). The permitted purpose need not be accomplished by one of the parties, but must occur somewhere in an associated transaction. Firms with a large number of active retail accounts and substantial revenue are exempt from the permitted purpose regulation and so can borrow for any reason.

Securities lenders, or their agents, are parties that presently own the security. The legal owner of a security is referred to as the "beneficial owner". Lenders wish to lend to make profit on their securities inventories that are otherwise idle. Big custody banks are the largest lenders in the US market, lending as agents on behalf of large institutional owners such as pension funds, public retirement funds, mutual funds and endowments. Additionally, brokers want to lend to enable their customers to accomplish short sales. Securities lending and margin finance are responsible for over half of prime brokerage revenues. At end 2007, US$2.1 trillion of equities were on loan in global markets.

Some security owners find short selling distasteful and will not lend as they believe short selling facilitates downward price pressure, thereby devaluing their inventory.

If not for certain "Prohibited Transaction Exemptions" issued by the U.S. Department of Labor, employee benefit plans would refrain from lending to avoid violating provisions of the Employee Retirement Income Security Act of 1974 ("ERISA").

A short sale consists of a trader selling stock that the trader does not own on trade day (T), and delivering borrowed stock on settlement day, which is the third day after the trade day (T+3). Eventually, the trader closes her position by buying stock, and terminating the stock loan. That is, the trade occurs on T, while the stock loan occurs on T+3. The trade settlement also occurs on T+3.

To bridge the time difference between T and T+3, "locate" practice is used in the securities industry. A locate is an affirmative determination that a party will provide the named quantity of securities three days hence.

A trader can obtain a locate by asking a broker, such as by telephone, email or instant message, or by consulting a locate file provided by the broker to the trader each morning, listing the inventory that the broker has available to loan. Not all locates are actually converted into loans. Reasons for non-conversion include that the stock is either not needed as the short seller closed her position prior to T+3 or that the stock was actually loaned by a party other than the locate provider.

A broker maintains lendable securities inventories when the broker trades for its own account, and when the broker holds securities on behalf of the margin accounts of customers who have bought the securities. Section 8 of the Exchange Act of 1934 prohibits brokers from lending shares held in retail cash accounts or retail non-margin accounts. Usually, when a retail customer opens a brokerage account, the terms of the account permit the broker to re-hypothecate and lend securities that the customer holds.

In exchange for a loan, the customer provides cash collateral in an amount slightly greater than the value of the securities, such as $102 of cash for each $100 of securities value. The broker pays interest to the securities borrower on the cash collateral. The "rebate rate" is the interest rate paid for the cash collateral. Negative rebates can and do occur, corresponding to expensive loans.

A securities loan is for a period of one-day and is self-renewing ("overnight self-renewing) unless either (a) the borrower returns the shares of the security, or (b) the lender recalls the shares of the security.

If the value of the security fluctuates, the amount of required cash collateral correspondingly fluctuates, so the borrower may have to supply more money or may receive money back.

If the broker lacks its own inventory to make a securities loan, the broker finds a lender, then the broker enters into a first securities loan contract with the lender, and then enters into a second securities loan contract with the borrower. The terms of the loan contracts are different, theoretically providing profit to the broker for its services in arranging the loan.

Generally, the loans have standardized terms and conditions, but the interest rates are different depending on the relationships between the parties (long-standing relationship vs. first transaction), the amount of stock being loaned (small loans tend to be more expensive per share) and the characteristics of the security (readily available vs. hard to find), and so on.

In the U.S., the Securities Industry and Financial Markets Association (SIFMA) provides and updates standardized terms for securities loans as the Master Securities Loan Agreement (MSLA), available at www.sifma.org/services/stdforms/pdf/master_securities_loan_agreement_2000_version.pdf In Europe, the International Securities Lending Association (ISLA) provides an updates standardized terms for securities loans as the Global Master Securities Loan Agreement (GMSLA), available at http://www.isla.co.uk/docs/Gmsla%202000%20version.doc.

FIG. 1 is a block diagram showing the conventional relationships between borrower 10, prime broker 20 and lender 30 for a pair of securities loans.

The first loan involves, at action A, borrower 10 providing cash collateral to broker 20, such as $105 per $100 of securities value. At action B, broker 20 provides a loan of the security shares to borrower 10, and at action C, broker 20 provides interest on the cash collateral to borrower 10. The interest is computed and credited to borrower 10 on a daily basis. The interest is expressed relative to the Federal Funds (FF) overnight interest rate, i.e., FF minus bb basis points.

The second loan involves, at action D, broker 20 providing cash collateral to lender 30, such as $102 per $100 of securities value. At action E, lender 30 provides a loan of the security shares to broker 20, and at action F, lender 30 provides interest on the cash collateral to broker 20. The interest computed and credited to borrower 10 on a daily basis. The interest is expressed relative to the Federal Funds overnight interest rate, i.e., FF minus ee basis points.

Broker 20 can make profit (or loss) from the difference in cash collateral between the first and second loans, and from the difference in interest paid on the cash collateral between the first and second loans.

The price of a stock loan means the interest rate paid to the borrower on the cash collateral posted to the lender. The borrower is not actually paying anything, but rather, choosing to accept more or less interest on the collateral.

From the borrower's perspective, "to pay more" means to accept a low interest rate on the loan. For easy to borrow, widely available securities, borrowers expect to be paid higher interest rates on their cash collateral. The borrower has many choices for sources of the stock, and is thus unwilling to pay a premium for the inventory.

From the lender's perspective, "to pay more" means to pay higher interest on the collateral. Lenders expect to pay higher interest rates when loaning very liquid securities. Ultimately, the lender profits are the difference between the cash reinvestment rate they earn internally relative to the rate paid to the borrower, or the difference between the interest rate the lender borrowed the stock at, and the rate they lend it at. In either case, a profit-maximizing lender chooses to offer securities at the lowest market clearing interest rate.

Figure 2:
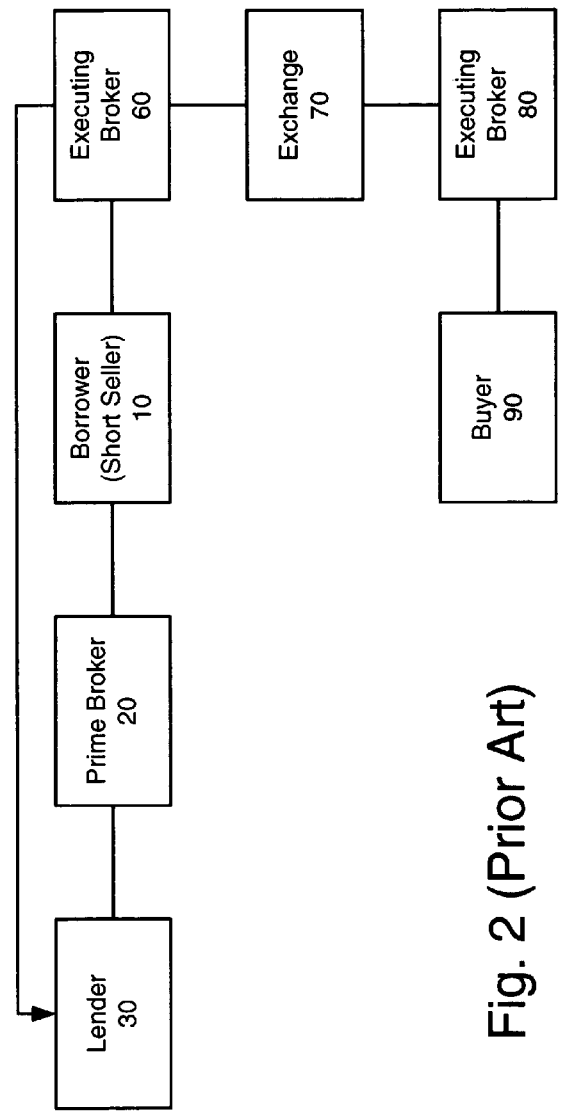
FIG. 2 is a block diagram showing entities conventionally participating in a securities loan and a securities trade.

FIG. 2 is a block diagram showing entities conventionally participating in a securities loan and a securities trade. On trade day T, borrower 10 obtains a locate to engage in a short sale of stock shares. Prime broker 20 provides the locate to borrower 10. If necessary, prime broker 20 obtains inventory for the locate via a second locate with lender 30. Borrower 10 sends its short sale order to executing broker 60, which relays it to exchange 70. Exchange 70 matches the short sale order with a buy order from buyer 90, relayed to exchange 70 via executing broker 80.

Prime broker 20, executing broker 60 and executing broker 80 are shown as different entities. In practice, one firm may fulfill one, two or three of these roles.

On settlement day, T+3, executing broker 60 actually makes the loan to borrower 10, from its inventory or if necessary, by borrowing stock from lender 30 (the same or a different instance of lender 30 that may have participated in the locate).

Figure 3A:
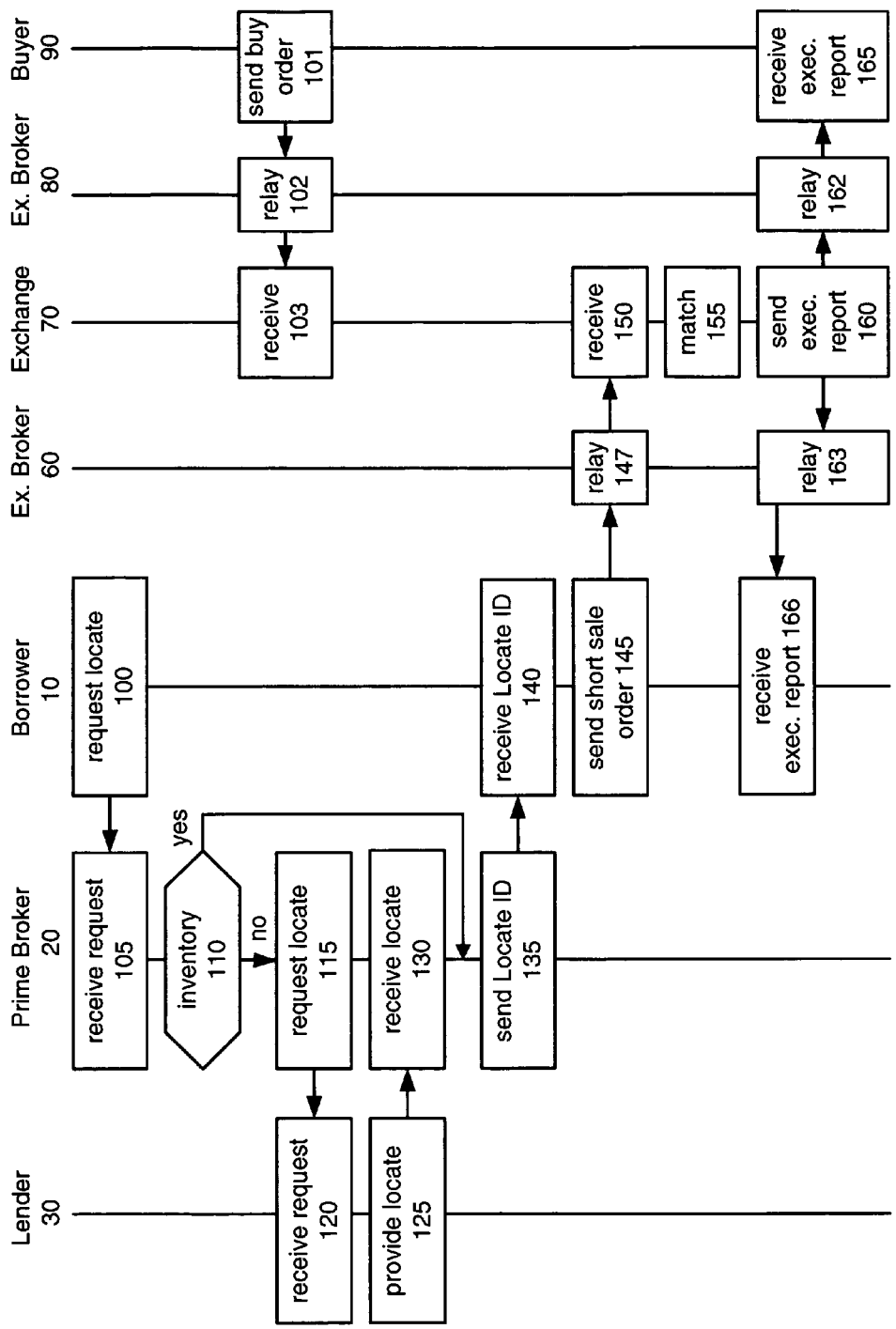
FIG. 3A-3B are a flowchart showing conventional actions involved in a securities loan for a short sale and the associated short sale trade.
Figure 3B:
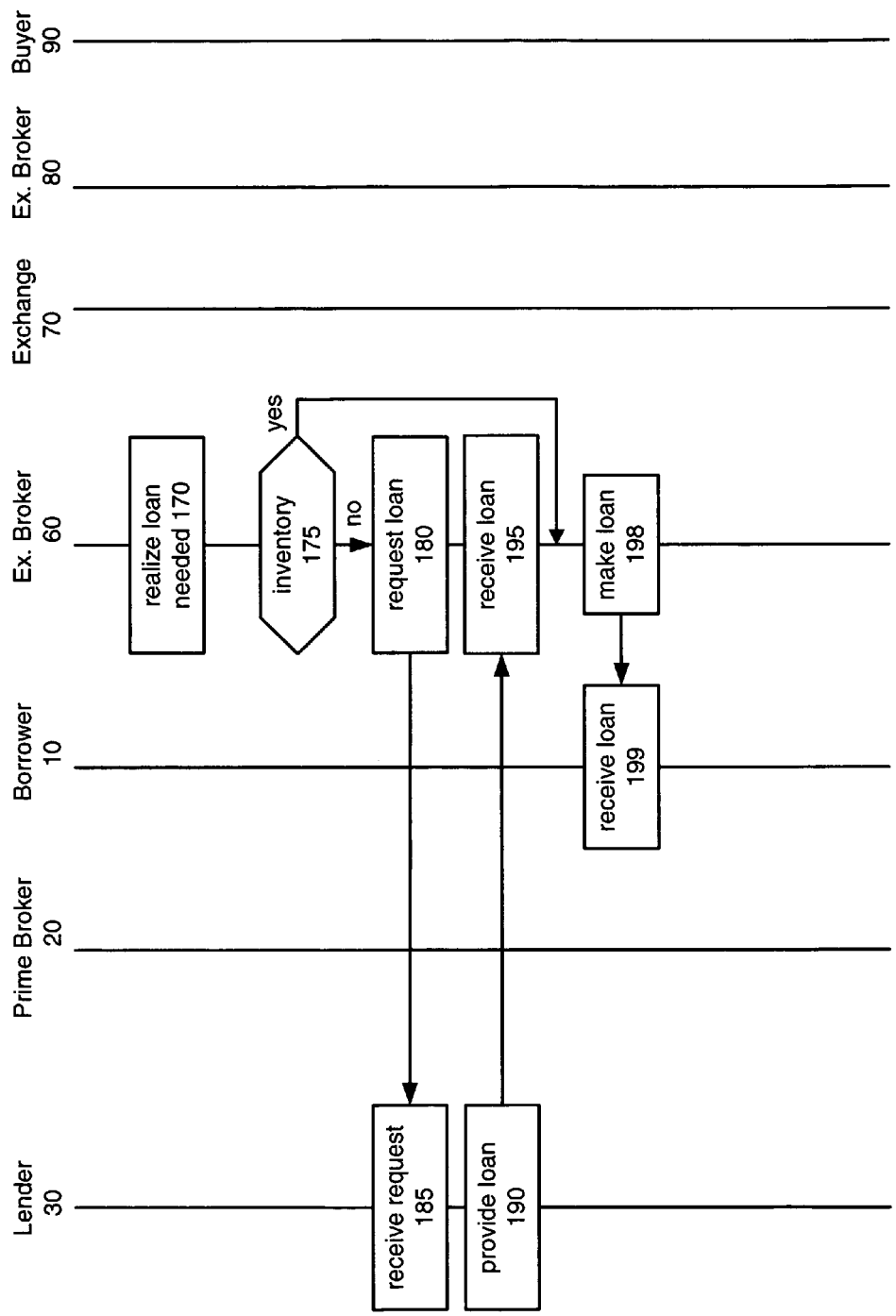

FIGS. 3A and 3B are a flowchart showing conventional actions involved in a securities loan for a short sale and the associated short sale trade, as generally described above. FIG. 3A shows activity on trade day T. FIG. 3B shows activity on settlement day T+3.

At step 100, borrower 10 requests a locate from broker 20, such as by calling broker 20 or sending an e-mail to broker 20.

In some embodiments, borrower 10 checks a locate file supplied to her each morning by broker 20. Borrower 10 can manually check the locate file, or the execution management system (EMS) being used by borrower 10 to enter a short order can automatically check the locate file and append the Locate ID to the short order.

Meanwhile, at step 101, buyer 90 sends a buy order for the security that borrower 10 is interested in to executing broker 80. At step 102, broker 80 receives the buy order and relays it to exchange 70. At step 103, exchange 70 receives the buy order.

At step 105, broker 20 receives the locate request. At step 110, broker 20 checks its stock inventory. The checking may occur via a person consulting an inventory database, or by a computer system checking a locate file. If broker 20 has sufficient inventory to provide the requested locate, then action continues at step 135. If broker 20 lacks sufficient inventory to provide the requested locate, then at step 115, broker 20 requests a locate, either by calling potential lenders on the telephone, by emailing potential lenders, or by checking an online system with locate files from third parties.

At step 120, lender 30 receives the locate request from broker 20, and at step 125, provides the locate. At step 130, broker 20 receives the locate from lender 30.

At step 135, broker 20 sends a locate to borrower 10. The locate identifies broker 20 and enables broker 20 to locate the specific shares promised for the loan to borrower 10. At step 140, borrower 10 receives the locate ID from broker 20. At step 145, borrower 10 sends a short sale order to executing broker 60, including the locate ID. At step 147, broker 60 relays the short sale order to exchange 70.

At step 150, exchange 70 receives the short sale order. At step 155, exchange 70 matches the short sale order received at step 150 with the buy order received at step 130. At step 160, exchange 70 sends an execution report to each of executing broker 60 and executing broker 80.

At step 162, executing broker 80 relays the execution report to buyer 90.

At step 163, executing broker 60 relays the execution report to borrower 10.

At step 166, borrower 10 receives the execution report from executing broker 60.

Turning to FIG. 3B, on day T+3, at step 170, the computer system for executing broker 60 realizes that a loan is needed to enable settlement of the short sale executed on day T. At step 175, the computer system for broker 60 checks its inventory. If broker 60 has sufficient inventory to make the loan, processing continues at step 199.

If broker 60 lacks sufficient inventory to make the loan, then at step 180, broker 60 requests a stock loan from lender 30. At step 185, lender 30 receives the stock loan request and at step 190, provides the securities loan and decrements its inventory of lendable stock. At step 195, broker 60 receives the securities loan.

At step 198, broker 60 makes a securities loan to borrower 10 and decrements its inventory of lendable stock. At step 199, borrower 10 receives the securities loan.

As mentioned, the securities loan is usually an overnight self-renewing loan. On day T+4, interest starts to be paid on the cash collateral from the collateral holder to the collateral provider. The daily interest rate is usually expressed relative to the Federal Funds rate which can change daily.

A small amount of the securities loan market occurs in a centralized clearinghouse environment called the OCC Stock Loan Program, a trade reporting facility that allows OCC's clearing members to use borrowed and loaned securities to reduce OCC margin requirements. In this program, the loan is legally between the borrower and lender, that is, non-anonymous, and OCC guarantees mark-to-market payment between the program participants.

So-called "processing systems" exist, such as Equilend and Loanet. Processing systems consolidate and track information about stock loans, typically negotiated by telephone and then entered to a processing system to avoid keeping paper activity records. Processing systems also perform other functions.

The above-described securities loan market is evolving as new types of clients have come into existence, is fraught with inefficiency and has problems.

A situation in the securities loan market is that as the years go by, margins in the securities loan business have been getting thinner because the financing costs paid by borrowers has been generally decreasing while infrastructure costs have remained approximately constant; meanwhile, the business is capital intensive and requires specialized staff who understand the arcane practices in the business.

Another situation in the securities loan market is the emergence of high frequency traders such as day traders and statistical arbitrageurs.

So called "day traders" close out their positions at the end of each day. A day trader may execute a short sale in the morning, and will then buy the stock before the end of the day. In these situations, a loan will never occur; nevertheless, a locate is required for the short sale. Day traders bring the overhead of a locate but no chance of a loan. An automated service, www.locatestock.com, fills this niche, that is, brokers that grant locates via this automated service charge a fee for each locate, expecting that a loan will not occur.

So called "statistical arbitrageurs" use statistical techniques to exploit trading opportunities that are usually intraday, but can be longer.

In the remainder of this document, the needs of non-settling borrowers are ignored.

Another problem in the securities loan market is that some customers are using trading strategies that cause them to close their short positions very quickly, such as within a few days. If borrower 10 returns the stock after only a few days, say on T+4 through T+8, then the lender(s) have virtually no time to make profit, that is, the slim profit they make just about covers their expenses. Reasons for stock returns include closing some or all of the short position, and finding a cheaper stock loan.

From the viewpoint of a lender, stock returns are undesirable behavior. In contrast, borrowers who borrow for a long time are desirable customers.

A substantial problem for a short seller is a lender recall of the securities loan. As permitted in the standard securities lending agreement, lender can take back, or recall, its stock for a variety of reasons: to sell the stock according to a trade decision, to lend the stock to a different customer, to participate in a shareholder vote, or because the lender hasmust obtain "possession and control" of customers' fully-paid and excess margin securities out on loan to comply with SEC Rule 15c3-3 (customer protection) and/or SEC Rule 15c3-1 (capital requirements for a firm). Recall rights sometimes exist for tax purposes: the IRS (Section 1058) requires a recall provision for manufactured dividend payments to remain nontaxable income (for certain exempt funds) and for the loan not to be treated as a sale.

Usually, broker 20 tries very hard to find substitute stock for borrower 10. If substitute stock cannot be found, then borrower 10 is forced to close ("cover") its short position immediately, which may wreak havoc with its trading strategy, and lead to a big loss during a "short squeeze", that is, a situation in which the price of the stock rises and investors who sold short rush to buy it to cover their short position and cut their losses. As the price of the stock increases, more short sellers feel compelled to cover their positions. In many cases, borrower 10 cannot simply create a new short position to replace the closed position as a new loan is unavailable. Borrowers consider a forced closing of their short position during a falling market to be a horrible event.

From the viewpoint of a borrower, stock recalls are disruptive events. Borrowers assert that prime brokers who protect the borrowers from recalls, by finding substitute stock for recalled stock, provide a valuable service. In contrast, lenders who lend as long as the borrower desires are trustworthy and preferred. The largest prime brokers state that they operate for years without recalling securities loans to their clients.

Generally, borrowers face the following challenges in the securities loan market: first, finding the stock; second, whether the loan is stable, i.e., not subject to a recall; third, getting the loan at as low a price as possible subject to stability; and fourth, whether the counterparty is creditworthy.

Thus, there is room for improvement in the securities loan market.

An automated marketplace for securities lending will now be discussed.

Figure 4:
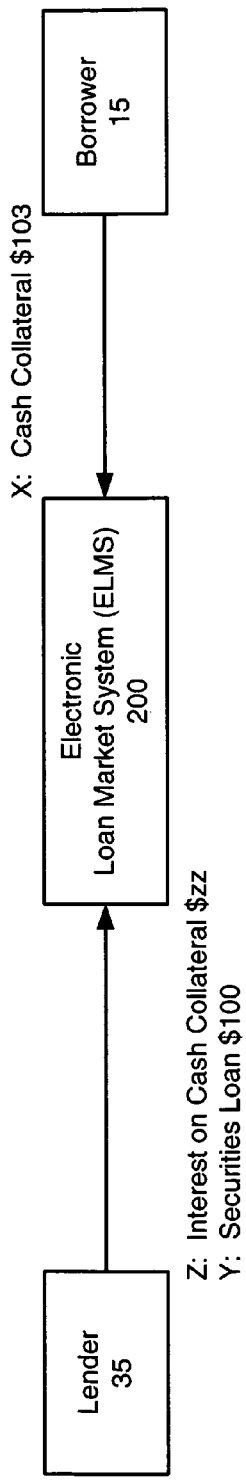
FIG. 4 is a block diagram showing a borrower, a lender and an automated market for securities loan.

FIG. 4 is a block diagram showing borrower 15, lender 35 and electronic loan market system (ELMS) 200. ELMS 200 is a computer system having one or more general purpose computers executing software for performing its functions, as discussed below, along with suitable communication facilities for its users, also referred to a market participants, specifically lender 35 and borrower 15, and suitable memory and storage.

Generally, lender 35 makes stock inventory available to ELMS 200. Lender 35 may be the parties discussed above as suitable for lender 30 or broker 20. ELMS 200 maintains a record of available inventory, by security. Borrower 15 sends a loan request to ELMS 200 and, after competing for the loan in ELMS 200, receives a loan commitment and a locate ID. Borrower 15 may be the parties discussed above as suitable for borrower 10 or broker 20.

The loan involves, at action X, borrower 15 providing cash collateral to lender 35, such as $103 per $100 of securities value. At action Y, lender 35 provides a loan of the security shares to borrower 15, and at action Z, lender 35 provides interest on the cash collateral to borrower 15. The interest payable is calculated daily, accrued, and paid at the end of the month to borrower 15. The interest is expressed relative to the Federal Funds (FF) overnight interest rate, i.e., FF minus zz basis points.

The identities of the parties to a loan are not known to each other. Accordingly, the personal relationships in the conventional securities loan market that deter undesirable behavior are entirely absent in the environment of FIG. 4, resulting in severe risk of negative externalities.

Automated structural, activity and economic incentives are provided in ELMS 200 to deter bad behavior and promote good behavior. Bad behavior refers to lender stock recalls and borrower stock returns, and other "gaming" behavior such as high frequency of cancellation of offers to borrow or lend, overly aggressive re-rates (a "re-rate" is a request to change the rate of a loan, initiated by either the borrower or seller, and sent to the universe of participants involved in lending the stock). Good behavior refers to lenders not recalling stock, and borrowers keeping the loan outstanding for long durations and having a low frequency of order cancellation and eschewing re-rates.

Structural incentives will now be discussed.

As a structural incentive, ELMS 200 is separated into two tiers, primary market 210 and secondary market 220. In other embodiments, three or more tiers may be provided. Primary market 210 is intended for participants exhibiting good behavior, that is, to replicate the stability available in the conventional un-centralized (distributed) securities loan market. Secondary market 220 is intended for all other participants, i.e., those exhibiting generally reasonable behavior. Secondary market 220 is suitable for smaller lenders who are comfortable operating differently than conventional large lenders.

The costs of obtaining a securities loan in primary market 210 are more than the costs in secondary market 220 to compensate lenders for expected stability. In other words, some borrowers prefer to pay a premium for stable supply and choose the more stable primary market 210 relative to the less stable secondary market 220. Thus, the primary market is structured to promote desirable behavior.

The process is identical for market tiers, with the differences being (i) the expectations of stability and price, and (ii) the eligible participant list for each market. The primary and secondary markets operate independently with separate auctions.

Inventory can be transferred between the primary and secondary pools depending on the access level of participants in the system. For example, it is possible for a borrower to remove inventory from the primary market to lend it to the secondary market, if the economics are favorable.

Figure 5:
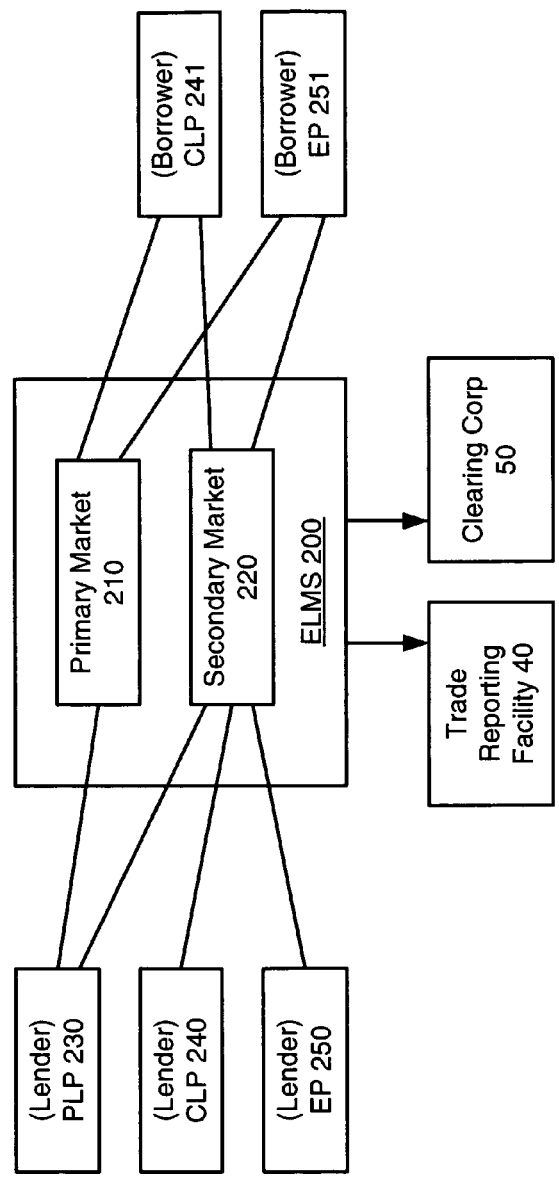
FIG. 5 is a more detailed block diagram of the entities in FIG. 4.

FIG. 5 is a more detailed block diagram of the entities in FIG. 4. ELMS 200 comprises primary market 210, secondary market 220, and associated facilities for record-keeping and reporting. ELMS 200 is a general purpose computer or computers that cooperate to execute a software program or programs according to the present invention. The entities in FIG. 5 communicate via wireline or wireless communications, using suitable ones of dedicated communication channels, private networks and/or public networks. ELMS 200 is provided with suitable equipment, such as memory, storage (e.g., magnetic, optical, magneto-optical or other suitable storage), input peripherals (e.g., keyboard, voice input, communication channel input) and output peripherals (e.g., displays, printers). ELMS 200 is provided with suitable software infrastructure, such as operating system, communication channel drivers, device drivers and so on.

Securities loans arranged through ELMS 200 are automatically reported by ELMS 200 to trade reporting facility 40 and clearing entity 50. ELMS 200 also provides a facility (not shown) for its participants to report manually negotiated securities loans to trade reporting facility 40 and clearing entity 50. Trade reporting facility 40 may be an existing processing service such as Equilend or Loanet. Clearing entity 50 may be one or more of Options Clearing Corporation (OCC), Depository Trust Clearing Corporation (DTCC), National Securities Clearing Corporation (NSCC), Boston Stock Exchange Clearing Corporation, Philadelphia Stock Exchange Clearing Corporation, or other suitable SEC regulated CA-1 facility that can clear security trades.

ELMS 200 arranges and records loans.

Clearing entity 50 is the counterparty to each loan.

Clearing entity 50 obviates the conventional privity between borrower and lender. Privity is a direct relationship between parties to a contract or transaction sufficient to support a legal claim. Benefits include: (i) operationally simpler—no separate loan agreement for each loan; (ii) more cost effective—reduced legal costs; and (iii) anonymous. Because ELMS 200 is involved in arranging each transaction, it can allocate activity according to an incentive system, and can be structured to facilitate incentives.

A lender is classified as one of primary liquidity provider (PLP) 230, competitive liquidity provider (CLP) 240 and electronic participant (EP) 250. Initially, a lender is assigned to one of these three categories, and over time, if the lender does not conform to the behavior required for the category, the lender may be re-assigned to another category. As discussed below, the lenders in each category are also ranked within the category. In other embodiments, different categories may be provided, such as a further category PLP+.

A borrower is one of CLP 241 and EP 251. By definition of a PLP, a PLP is only a lender. Examples of a PLP include insurance companies and pension funds. An EP is permitted to lend only in the secondary market. CLP 240 and CLP 241 are entities in the same category, but one is acting as a lender and the other as a borrower. A CLP entity can be either a lender or a borrower over the course of its life, but in a particular transaction it assumes one role. EP 250 and EP 251 are, similarly, entities in the same category but one is acting as a lender and the other as a borrower.

Borrowers generally request a loan to either (i) refinance an existing (already settled) short position, or (ii) provide inventory for an executed short order that is settling.

The specific category characteristics for a PLP, CLP and EP are outside the scope of the present application.

Another structural incentive is the excellent credit rating of clearing entity 50 that guarantees the daily mark-to-market of cash flows in the event of counter-party default. For example, assume that a borrower provided $102 cash for $100 of securities, and that the securities lender then went out of business and did not return the cash. Without a guarantee, the borrower would lose $2 plus any increase in the market value of the securities. The borrower loses the difference between the cash posted and the stock price, therefore if the stock price goes down the borrower loses more money as the collateral he holds is worth less. Of course, if the securities had increased in value sufficiently, the borrower would have a net gain. With a guarantee, clearing entity 50 reimburses the borrower for her loss, if any.

Activity incentives will now be discussed.

U.S. Pat. No. 6,618,707 (Katz) discloses a system for automating options trading in which an incoming order is filled against quotations based on the size of the quotations, as an incentive for members to provide quotations of more than the minimum size. This is an example of a positive activity incentive.

Another example of a positive activity incentive is the practice of certain prior art marketplaces paying participants for order flow.

Within each market tier of ELMS 200, participant behavior leads to a ranking for that participant. When specific events, such as new loans, returns, recalls, re-rates and so on occur, these events are allocated based on participant ranking. Desire to avoid unwanted events, and to receive desired events, leads participants to care about their ranking. This is similar to how personal relationships induce people to behave better. Studies of eBay's feedback system indicate that the mere existence of a mechanism that monitors behavior can improve performance of parties using a transactional system.

The ranking may be a unique sequential rank within a category of participant or marketplace tier, or may be a market-wide (global) level of rank, such as "superior", "normal", "poor" and so on.

An example of how a participant's behavior can change their ranking is now discussed.

Assume that rank is a unique sequential number, and category is PLP, and there are five PLP participants: PLP-1, PLP-2, PLP-3, PLP-4 and PLP-5. Further assume that, at the start of the day, their ranking was as shown in Table 1, corresponding to the number of loan recalls ever initiated by the participant.

TABLE 1

| Rank | Participant | No. recalls |
|------|-------------|-------------|
| 1 | PLP-1 | 6 |
| 2 | PLP-2 | 4 |
| 3 | PLP-3 | 2 |
| 4 | PLP-4 | 1 |
| 5 | PLP-5 | 0 |

Let it be assumed that during the day, there were only two recalls in primary market 210 and both recalls were from PLP-4 that formerly had only one (1) recall. At the end of the day, ELMS 200 adjusts the rankings so that PLP-4, with three (3) recalls, has a higher rank as shown in Table 2.

TABLE 2

| Rank | Participant | No. recalls |
|------|-------------|-------------|
| 1 | PLP-1 | 6 |
| 2 | PLP-2 | 4 |
| 3 | PLP-4 | 3 |
| 4 | PLP-3 | 2 |
| 5 | PLP-5 | 0 |

In other embodiments, the recalls are measured relative to a moving window, for example, the last two weeks, or percentage of the last 100 loans, or any other suitable metric.

The rankings operate as a sort of automated Golden Rule: do unto ELMS 200 as you would have it do unto you. That is, the more undesirable behavior (loan recalls) that a PLP participant initiates, the more undesirable behavior (stock returns) will the PLP be subject to.

Economic incentives will now be discussed.

Certain events are defined as desirable or undesirable, and when performed by a market participant, incur monetary incentives or disincentives. Here, it is useful to define behavior as relative to a benchmark for what is normal for a category of market participant.

Figure 6:
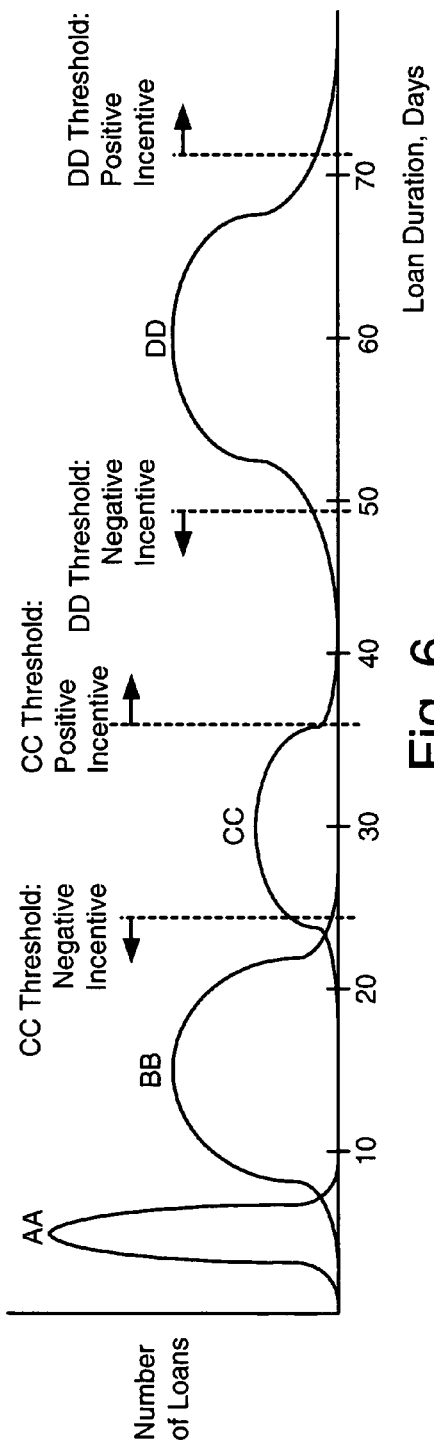
FIG. 6 is a chart showing hypothetical loan profiles for four different market participants.

FIG. 6 is a chart showing hypothetical loan duration profiles for four different market participants where the term of the loan was ended by the participant. The abscissa (X-axis) is loan duration in days; the ordinate (Y-axis) is how many loans have the specified duration. Curve AA shows a high frequency trader, such as a hedge fund executing automated programs resulting in frequent buys and sells. As shown, curve AA has an average loan duration of 5 days. Curve BB shows a broker lending stock from its own inventory (from its own account or held on behalf of retail customers), the loans having an average duration of 15 days. Curve CC shows a so-called long-short trader, such as a hedge fund, having an average loan duration of 30 days. Curve DD shows a pension fund that can readily accommodate long duration loans, shown as having an average of 60 days.

Generally, the parties represented by curves BB and DD should use primary market 210, while the parties represented by curves AA and CC should use secondary market 220.

For curve DD, bad behavior is represented by short duration loans, the leftmost tail of the curve. The cutoff is set as, for example, the number of days that is two standard deviations from the average length ($\mu-2\sigma$), or the number of days such that 5% of the loans are shorter than that number, or any other suitable threshold.

For curve DD, good behavior is represented by long duration loans, the rightmost tail of the curve. The cutoff is set as, for example, the number of days that is two standard deviations from the average length ($\mu+2\sigma$), or the number of days such that 5% of the loans are longer than that number, or any other suitable threshold.

Good and bad behavior are defined similarly for each of curves AA, BB and CC.

Although FIG. 6 assesses the number of loans, in other embodiments, instead, the value of the loans is assessed, or the number of shares loan. Generally, the profiles are computed for each security over a moving window of time, with the window varying by security, that is, thinly traded stocks have a longer window such as one month, while actively traded stocks have a shorter window such as one week.

Figure 7:
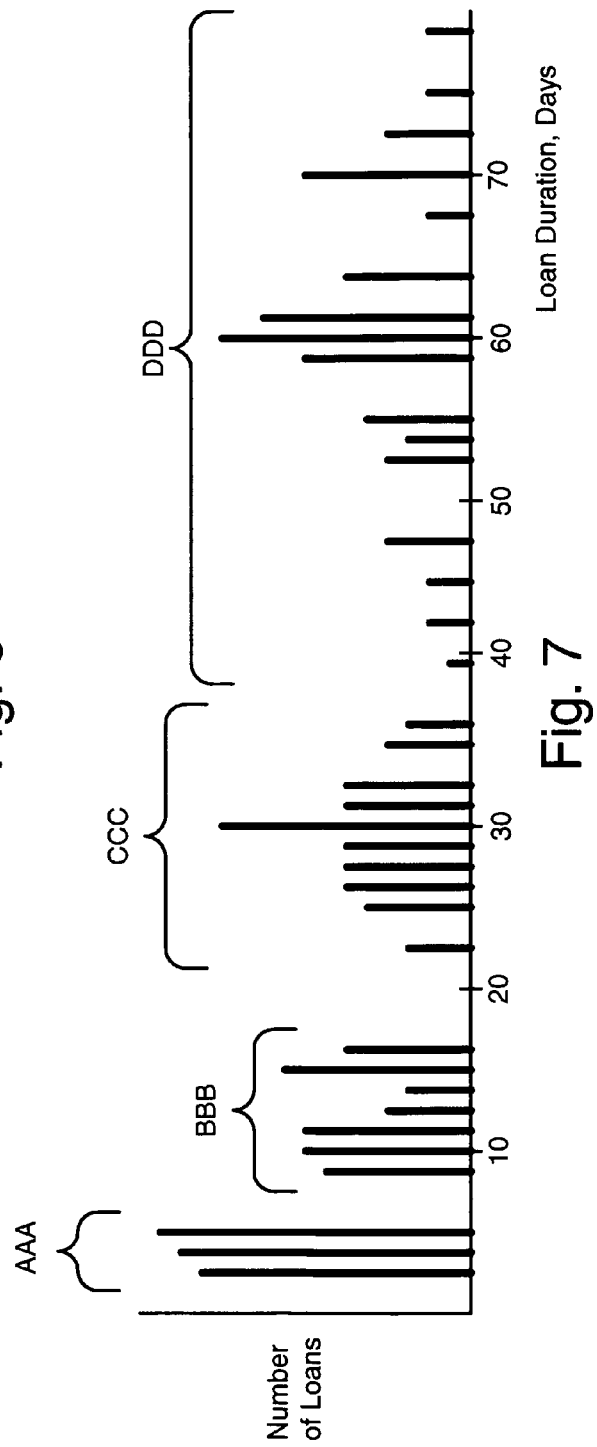
FIG. 7 is a chart showing daily activity for four hypothetical market participants.

FIG. 7 is a chart showing daily activity for four hypothetical market participants. Curve AAA shows that its market participant terminated, for instance, 7 loans after 4 days, 9 loans after 5 days and 11 loans after 5 days. Comparing curve AAA in FIG. 7 with curve AA in FIG. 6, it is seen that the activity represented by curve AAA is "normal" for curve AA, and so market participant AAA will not get incentives.

Comparing curve BBB in FIG. 7 with curve BB in FIG. 6, it is seen that the activity represented by curve BBB is "normal" for curve BB, and so market participant BBB will not get incentives.

Comparing curve CCC in FIG. 7 with curve CC in FIG. 6, it is seen that the activity represented by curve CCC shows an undesirably short loan of duration about 23 days, and some desirably long loans of duration about 35 and 36 days. Market participant CCC should get a negative incentive and two positive incentives.

Comparing curve DDD in FIG. 7 with curve DD in FIG. 6, it is seen that the activity represented by curve DDD shows some undesirably short loans of duration under 50 days, and some desirably long loans of duration over 70 days. Market participant DDD should get negative incentives and positive incentives.

Operation of the incentives in ELMS 200 will now be discussed in detail.

Figure 8A:
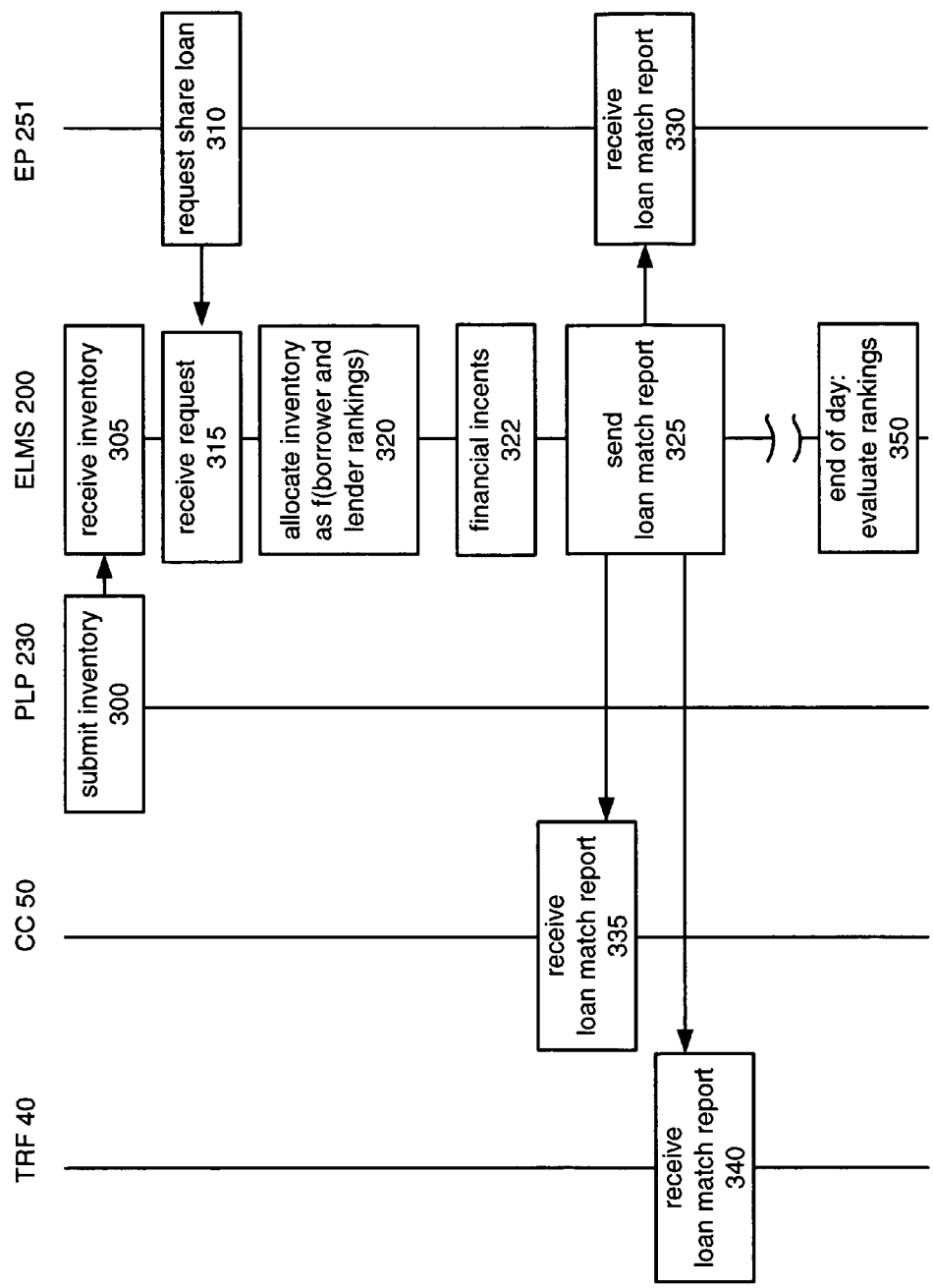
FIGS. 8A-8C are a flowchart showing automated establishment of a securities loan.
Figure 8C:
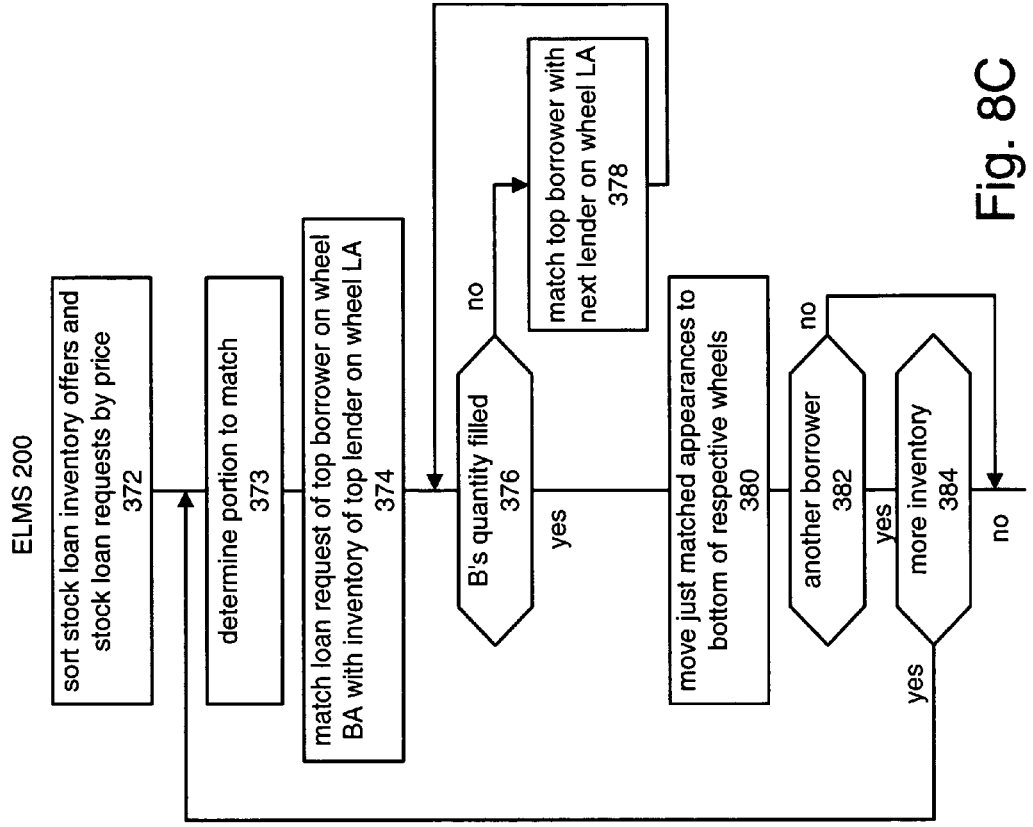
Figure 8B:
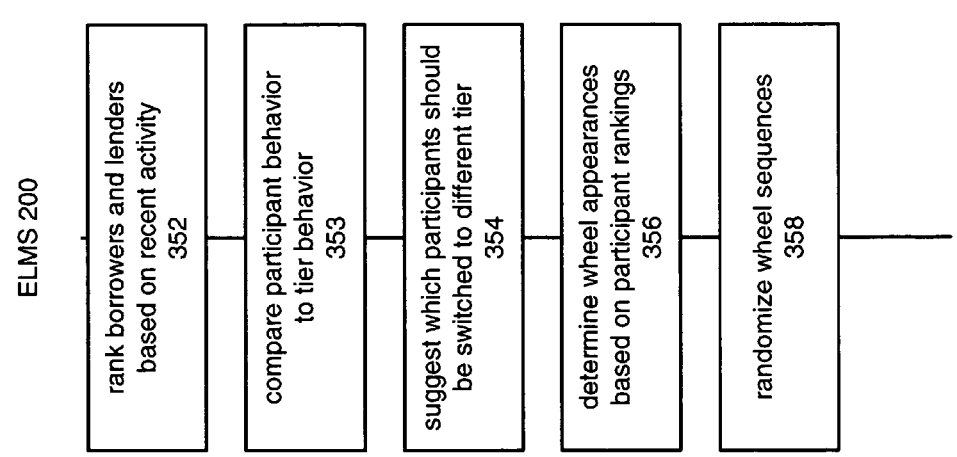

FIGS. 8A-8C are a flowchart showing automated establishment of a securities loan.

At step 300, PLP 230 submits its stock inventory available for lending to ELMS 200. At step 305, ELMS 305 receives the stock inventory and stores it in a data file.

At step 310, EP 251 request a stock loan from ELMS 200. At step 315, ELMS 200 receives the loan request, and checks its data files for available inventory. In this case, ELMS 200 finds the inventory from PLP 230 that is in the correct stock and of sufficient quantity to support the requested loan, and determines that no other lenders have suitable inventory.

At step 320, ELMS 200 allocates the inventory to EP 251, discussed in detail with regard to FIG. 8C.

At step 322, ELMS 200 decides whether to assign positive or negative financial incentives to the borrowers and lenders participating in the stock loan match. Generally, if incentives are earned relative to the auction match, the incentives are positive, as it is desirable to encourage match activity. An example of a positive financial incentive is a rebate on marketplace fees imposed by ELMS 200.

At step 325, ELMS 200 sends a loan match report for the allocated inventory to EP 251, trade reporting facility 40 and clearing corporation 50. At step 330, EP 251 receives the loan match report for its requested loan. At step 335, clearing corporation 50 receives the loan match report. At step 340, trade reporting facility 40 receives the loan match report.

In other cases, inventory from multiple lenders can be used to fulfill the stock loan request.

In other embodiments, instead of lenders, such as PLP 230, providing an inventory list at the start of the day, the lenders register as wanting to be advised when there is a loan request within a specified quantity range for various symbols. ELMS 200 then broadcasts the loan request to registered lenders. ELMS 200 selects interested lenders according to a procedure, such as waiting a predetermined time for indications from lenders, then selecting the lender of best rank at the best price.

At the end of the day, at step 350, ELMS 200 collects activity information for all market participants and updates their respective rankings with their category, discussed in detail with regard to FIG. 8B. ELMS 200 also flags participants whose category should be altered, to human analysts. In this embodiment, a lender's behavior can indicate it should be changed from CLP status to PLP status, or from PLP status to CLP status; in other embodiments, different alterations occur. Or, the behavior could result in access privileges being changed from primary to secondary access.

FIG. 8B provides detail for step 350 of FIG. 8A.

At step 352, market participants, i.e., borrowers and lenders, are rated based on recent activity, as discussed above. The outcome is a ranking or rating for each participant, such as "good", "normal" or "poor".

At step 353, ELMS 200 compares the participant's behavior relative to "tier-normal" behavior. As used herein and in the claims, "tier-normal" refers to behavior that is appropriate for the tier, based on the actual behavior of other participants in the tier and/or a hypothetical profile for the tier. FIG. 6 shows hypothetical profiles for different participants in different tiers. When a behavior is within the positive and negative thresholds, it is normal for the tier.

At step 354, ELMS 200 produces a report suggesting which participants, if any, should be changed to a different market tier. Participants below the negative threshold for tier-normal behavior are candidates for a lower tier. Participants above the positive threshold for tier-normal behavior are candidates for a higher tier. In the present embodiment, this decision is made by a human; in other embodiments, the decision is made by ELMS 200, using a decision criterion such as how long the participant has maintained a ranking of poor, or other suitable criterion.

As used herein and in the claims, a "participant wheel" is an ordered sequence used in assigning specific events to market participants as a function of their behavior. In this embodiment, there are four wheels: wheel LA is used to assign new stock loans to lenders in a loan auction, wheel BA is used to assign new stock loans to borrowers in a loan auction, wheel LR is used to assign stock returns to lenders, and wheel BR is used to assign stock recalls to borrowers. In other embodiments, other wheels may be used.

Generally, a wheel is associated with a wheel formula, specifying the number of appearances in the ordered sequence that a participant earns in accordance with the participant's rank. For example, a rank of "good" earns three appearances, a rank of "normal" earns two appearances, and a rank of "poor" earns one appearance.

At step 356, ELMS 200 determines the wheel appearances based on the participant rankings.

At step 358, ELMS 200 places the appearances into an ordered sequence. In this embodiment, a pseudo-random sequence of numbers corresponding to the number of appearances is generated, and then the appearances are ordered according to the pseudo-random sequence.

An example of wheel construction will now be discussed.

Assume that the participants for ELMS 200 are lenders L1, L2, L3 and borrowers B1, B2, B3, B4 having ranks, determined as above, shown in Table 3.

TABLE 3

| lender participant | rank | borrower participant | rank |
|---|---|---|---|
| L1 | good | B1 | good |
| L2 | normal | B2 | normal |
| L3 | normal | B3 | normal |
|  |  | B4 | poor |

Further assume that the formulas for the auction wheels and recall and return wheels are as shown in Table 4. Note that for wheel BR, a rank of "good" corresponds to zero appearances, that is, a borrower participant with a rank of good will never experience a stock loan recall. In other embodiments, other formulas are used.

TABLE 4

| wheel LA | | wheel LR | | wheel BA | | wheel BR | |
|---|---|---|---|---|---|---|---|
| rank | appears | rank | appears | rank | appears | rank | appears |
| good | 3 | good | 1 | good | 3 | good | 0 |
| normal | 2 | normal | 3 | normal | 2 | normal | 1 |
| bad | 1 | bad | 5 | bad | 1 | bad | 3 |

For wheel LA, L1 has a rank of good and thus three appearances, denoted as L1a, L1b and L1c. Table 5 shows the appearances in each wheel.

TABLE 5

| no. appears | wheel LA | wheel LR | wheel BA | wheel BR |
|---|---|---|---|---|
|  | L1a, L1b, L1c | L1a | B1a, B1b, B1c |  |
|  | L2a, L2b | L2a, L2b, L2c | B2a, B2b | B2a |
|  | L3a, L3b | L3a, L3b, L3c | B3a, B3b | B3a |
|  |  |  | B4a | B4a, B4b, B4c |
| total | 7 | 7 | 8 | 5 |

Wheel LA has seven appearances. ELMS 200 places the numbers one through six in pseudo-random order, for example: 3462715. Similarly, wheel LR has seven appearances, and ELMS 200 generates the following pseudo-random sequence: 7143256; for wheel BA, the sequence is 27361458, and for wheel BR, the sequence is: 41352.

Finally, ELMS 200 orders the appearances in accordance with the pseudo-random sequence, as shown in Table 6. For example, wheel BR is initially populated with five entries (B2a B3a B4a B4b B4c), corresponding to a 1/5 chance of being chosen for each of participants B2 and B3, and a 3/5 chance of being chosen for participant B4. Consider entries (B2a B3a B4a B4b B4c) as having the sequence (1 2 3 4 5). Now, the sequence digits are pseudo-randomly arranged into the order 41352, corresponding to the sequence B4b B2a B4a B4c B3a.

TABLE 6

| wheel | pseudo-random no. | (original sequence that populates the wheel) ordered sequence of participant appearances |
|---|---|---|
| LA | 3462715 | (L1a L1b L1c L2a L2b L3a L3b) L1c L2a L3a L1b L3b L1a L2b |
| LR | 7143256 | (L1a L2a L2b L2c L3a L3b L3c) L3c L1a L2c L2b L2a L3a L3b |
| BA | 27361458 | (B1a B1b B1c B2a B2b B3a B3b B4a) B1b B3b B1c B3a B1a B2a B2b B4a |
| BR | 41352 | (B2a B3a B4a B4b B4c) B4b B2a B4a B4c B3a |

Examples using the wheels are provided below.

At step 372, ELMS 200 sorts the stock loan inventory offers and stock loan requests by security and price, grouping together all offers and requests for a particular stock at a particular price.

At step 373, ELMS 200 determines how much to match. In the present embodiment, the full amount of each borrower's request can be matched to one lender's inventory offer. In other embodiments, constraints are applied, such as (i) a maximum of 50% of a lender's inventory offer can be matched to one borrower, (ii) the portion of a lender's inventory that can be matched to one borrower is limited to three times the lender's inventory offer divided by the total inventory being offered by all lenders, (iii) borrower requests are divided into sub-requests each having a maximum of 20,000 shares, and so on. The constraints exist to protect the exposure of borrowers and lenders, and to ensure many transactions so that the probability of loan matches more closely tracks what is expected from the wheel.

At step 374, for each stock and price grouping, ELMS 200 takes the top borrower from wheel BA and the top lender from wheel LA, and attempts to match the borrower's request with the lender's inventory. If the lender's inventory amount is greater than or equal to the borrower's request, then there is a full match. If the inventory is less than the request, then there is a partial match.

At step 376, ELMS 200 determines whether the borrower's request is fully matched. If so, processing continues at step 380. If not, at step 378, ELMS 200 takes the next lender from wheel LA, and attempts to match the borrower's request with the lender's inventory. If the lender's inventory amount is greater than or equal to the borrower's request, then there is a full match. If the inventory is less than the request, then there is a partial match. Processing returns to step 376.

At step 380, the borrower's stock loan request has been fully filled by matching to lender's inventory. The appearances, taken from the wheels, used in the match are moved to the bottom of the respective wheels. Eventually, as more auctions occur, these appearances will rise to the top and again experience matches.

At step 382, ELMS 200 determines whether there is another borrower in the auction by taking the next top ranked borrower on wheel BA. If not, processing is complete. If so, at step 384, ELMS 200 determines whether there are more lenders with suitable inventory; if so, processing returns to step 374. If not, processing is complete.

An example of an auction match using the wheels LA and BA is now discussed.

Assume that after step 372, ELMS 200 has created a grouping for stock XYZ at loan price 2% as follows: Lender L1—100,000 shares, Lender L2—50,000 shares, Borrower B2—10,000 shares, Borrower B3—20,000 shares. That is, Lender L1 is offering to lend 100,000 shares of XYZ at a loan price of FF-2%, Borrower B2 is requesting a stock loan of 10,000 shares of XYZ at a loan price of FF-2%, and so on.

At step 374, ELMS 200 takes the top borrower from wheel BA and the top lender from wheel LA, and attempts to match the borrower's request with the lender's inventory. The top borrower on wheel BA corresponds to the first appearance on wheel BA, namely, "B1b" as shown in Table 6. This is an appearance for borrower B1.

However, borrower B1 is not part of the grouping for this auction, so ELMS 200 continues to the next appearance on wheel BA, namely, "B3b" as shown in Table 6. This is an appearance for borrower B3 who is part of the grouping for this auction. So, ELMS 200 will now determine who provides the inventory for borrower B3's loan request of 20,000 shares.

ELMS 200 reads wheel LA and obtains "L1c" as shown in Table 6. This is an appearance for lender L1, who is part of the grouping for this auction, and is offering 100,000 shares for loan. ELMS 200 matches B3's request for 20,000 shares against L1's inventory to create a stock loan of 20,000 shares of XYZ at a rate of FF-2%.

At step 376, ELMS 200 determines that B3's request is fully matched.

At step 380, ELMS 200 moves the appearances that participated in the match to the bottom of the wheel, so that the new sequence is as shown in Table 7.

TABLE 7

| wheel | pseudo-random no. | ordered sequence of participant appearances |
|---|---|---|
| LA | 3462715 | (L1c L2a L3a L1b L3b L1a L2b) L2a L3a L1b L3b L1a L2b L1c |
| BA | 27361458 | (B1b B3b B1c B3a B1a B2a B2b B4a) B1b B1c B3a B1a B2a B2b B4a B3b |

At step 382, ELMS 200 determines that there is another borrower in this auction, namely, borrower B2 wanting a stock loan of 10,000 shares of XYZ. There are no other remaining borrowers, so B2 is selected by obtaining its topmost appearance on wheel BA, namely "B2a" from Table 7.

At step 384, ELMS 200 determines that there are more lenders with suitable inventory, namely, L1 with 100,000-20,000=80,000 shares, and L2 with 50,000 shares, so processing returns to step 374.

At step 374, ELMS 200 reads wheel LA and obtains "L2a" as shown in Table 7. This is an appearance for lender L2, who is part of the grouping for this auction, and is offering 50,000 shares for loan. ELMS 200 matches B2's request for 10,000 shares against L2's inventory to create a stock loan of 10,000 shares of XYZ at a rate of FF-2%.

At step 376, ELMS 200 determines that B2's request is fully matched.

At step 380, ELMS 200 moves the appearances that participated in the match to the bottom of the wheel, so that the new sequence is as shown in Table 8.

TABLE 8

| wheel | pseudo-random no. | ordered sequence of participant appearances |
|---|---|---|
| LA | n/a | (L2a L3a L1b L3b L1a L2b L1c) L3a L1b L3b L1a L2b L1c L2a |
| BA | n/a | (B1b B1c B3a B1a B2a B2b B4a B3b) B1b B1c B3a B1a B2b B4a B3b B2a |

In this example, all loan requests were fully matched. However, in other examples, there might not be enough inventory to satisfy all the loan requests, so borrowers with high ranks would be more likely to get matches, whereas borrowers with low ranks would be less likely to get matches.

As will be appreciated, lenders and borrowers with high ranks have better chances of participating in auctions due to their increased number of appearances on the wheels LA and BA.

In this embodiment, financial incentives are not part of an auction match. However, in other embodiments, financial incentives are provided. In one embodiment, hard to find securities can earn incentives for lenders who provide them. In another embodiment, borrowers who request loans greater than a threshold (number of shares or value of loans) can earn incentives, generally corresponding to the prior art practice of paying for order flow. The incentives may be reductions in transactional usage fees for ELMS 200 or other suitable type of incentive.

Figures 9A, 9B:
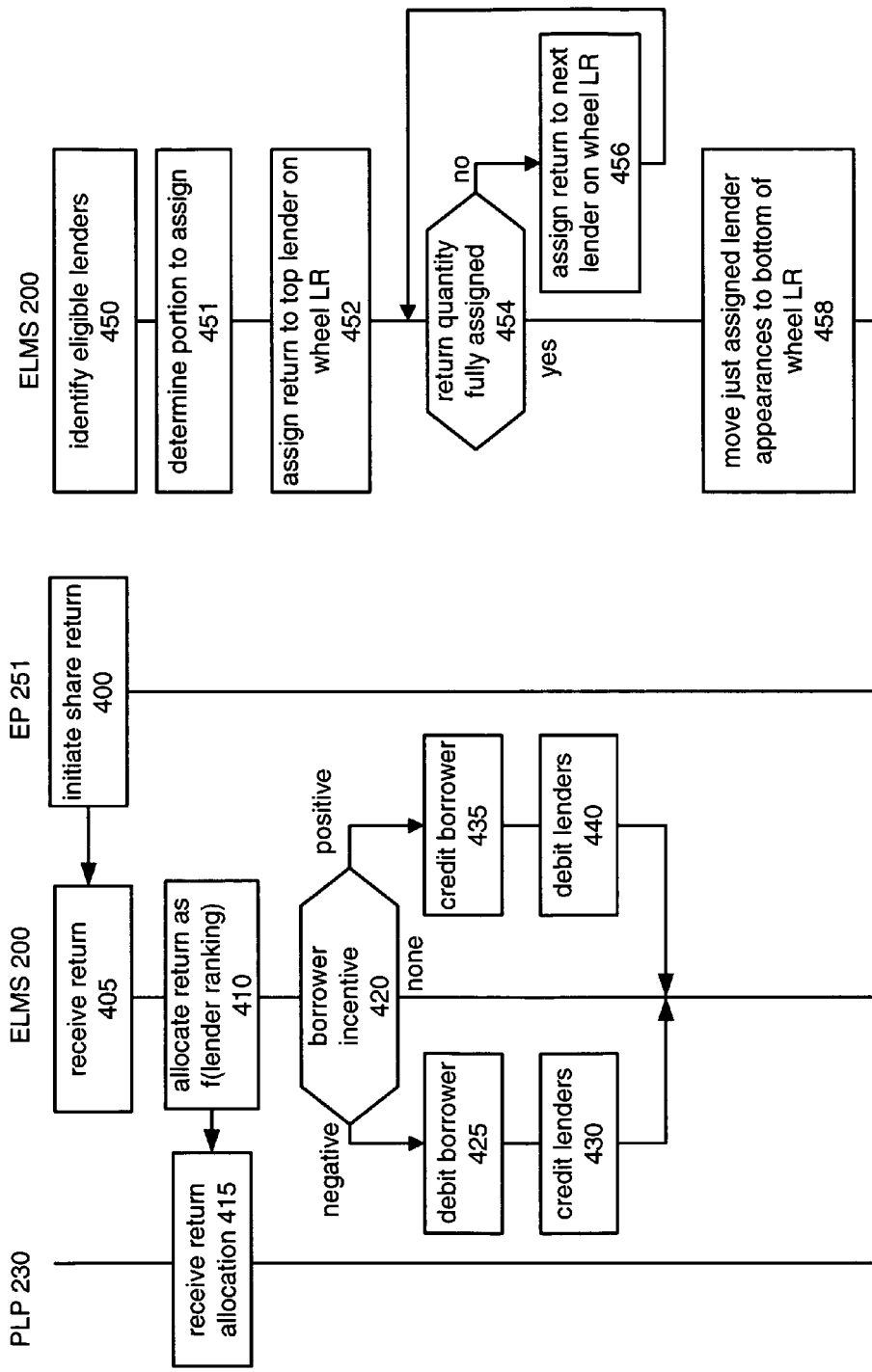
FIGS. 9A-9C are a flowchart showing automated incentives for a borrower.

FIGS. 9A-9B are a flowchart showing automated incentives for a borrower.

At step 400, EP 251 initiates a share return. At step 405, ELMS 200 receives the share return.

At step 410, ELMS 200 allocates the share return to a lender, discussed below with regard to FIG. 9B. At step 415, PLP 230 receives the share return allocation.

Since the share return is based on the ranking, this demonstrates why lenders have an incentive to have a good ranking.

At step 420, ELMS 200 determines whether EP 251 should be financially incentivized for this return activity. In the case of a return, in some embodiments, a borrower can earn positive financial incentives for providing a too-early return of hard-to-borrow stock, relative to the borrower's profile, or for providing a return after holding a stock loan for an extremely long period. In some embodiments, such as a marketplace for term loans, a borrower can earn negative incentives for providing a too-early return of stock.

The negative financial incentive is the difference between the rates in primary market 210 and secondary market 220, the difference being defined as "economic neutrality", plus a marginal incentive, to encourage borrowers to choose the correct market when the loan is initiated, or discourage borrowers from choosing the wrong market.

$$Incentive = \sum_{days\ of\ Loans} LoanValue * (SecondaryRate + MargIncentiveRate - PrimaryRate)/365$$

Generally, the loan rates are based on the Federal Funds (FF) rate modified by a particular number of basis points (BP) with one basis point=0.01%. Assuming a current FF rate=2%, then, for example, PrimaryRate=FF−100 BP=2%−100 BP=1%

SecondaryRate=FF−50 BP=2%−50 BP=1.5%

MargIncentiveRate=5 BP

Thus, the daily loan value is multiplied by (1.5%+ 5BP−1%)=0.55% times the number of days outstanding divided by 365.

The incentive must be assessed separately for each loan terminated because stability varies by security.

The incentive may be a different amount for each type of activity. For example, stock returns that are after only a small number of days may have a negative incentive of 5 BP, while stock recalls may have a negative incentive of 10 BP. The incentive may itself be a function of other parameters. For example, the parameter may be the number of days less than a negative threshold for a profile.

ELMS 200 assesses stability as a percentile position within the loan distribution for similar securities, and compares the assessed position to a predetermined threshold, as described below.

The number of days is assessed relative to the typical behavior for that market (primary or secondary) and that security. For example, assume that for the security XYZ, and calculated over all loan participants, for loan terminations initiated by the borrower, the average loan length is 6 days ($\mu$=6) and the standard deviation is 1 day ($\sigma$=1) (see FIG. 6 curve AA), and a negative incentive is earned if the loan is terminated sooner than two standard deviations from the average, i.e., the negative incentive (left side of the curve in FIG. 6) is for loan terminations of length $\mu-2\sigma$=6−2*1=4 days or shorter. A positive incentive (right side of the curve in FIG. 6) is due if the loan is terminated after two standard deviations from the average, i.e., the reward is for loan terminations of length $\mu+2\sigma$=6+2*1=8 days or longer. Loans terminations in the range of ($\mu-2\sigma$) to ($\mu+2\sigma$) days, i.e., 4-8 days, are normal and incur no incentive.

So, if a loan is terminated after 3 days, then for each of the three days, the loan incurs a negative incentive of the loan value times 0.55%/365*number of days outstanding, in addition to the economic neutrality amount (see formula above).

If, at step 420, it is determined that a financial incentive is not warranted, then processing is complete.

If, at step 420, it is determined that a negative financial incentive is warranted, then at step 425, the borrower is debited by the disincentive amount. At step 430, the lender is credited by the disincentive amount. In some embodiments, step 430 is omitted and the funds are used according to a procedure beyond the scope of this document.

If, at step 420, it is determined that a positive financial incentive is warranted, then at step 435, the borrower is credited by the incentive amount. At step 440, the lender is debited by the incentive amount. In some embodiments, step 440 is omitted.

FIG. 9B provides detail for step 410 of FIG. 9A.

At step 450, ELMS 200 identifies lenders who are eligible to accept a stock return, that is, lenders having outstanding loans of the stock symbol being returned at the same rate as the stock being returned.

At step 451, ELMS 200 determines the portion to assign, in a manner similar to that discussed with respect to step 373 of FIG. 8C.

At step 452, ELMS 200 assigns the return to the top lender appearance on wheel LR that is eligible.

At step 454, ELMS 200 determines whether the stock return has been fully assigned. If not, then at step 456, ELMS 200 gets the next eligible lender appearance from wheel LR and assigns the return, and processing returns to step 454.

At step 458, ELMS 200 moves the just assigned lender appearances to the bottom of wheel LR.

Partial returns are processed similarly.

An example of a stock return using the wheel LR is now discussed.

Assume that borrower B4 returns 10,000 shares of XYZ.

At step 450, ELMS 200 identifies lenders L2 and L3 as eligible to accept an XYZ stock return as each of them have loaned 100,000 shares of XYZ stock through ELMS 200. Here, lender L1 is ineligible as it never offered shares of XYZ for a stock loan through ELMS 200.

At step 452, ELMS 200 assigns the return to the top lender appearance on wheel LR that is eligible. As seen in Table 6, wheel LR has a sequence of: L3c L1a L2c L2b L2a L3a L3b.

The first appearance is L3c, corresponding to lender L3 who is eligible, so the 10,000 share return from borrower B4 is assigned to lender L3.

At step 454, ELMS 200 determines that the stock return has been fully assigned.

At step 458, ELMS 200 moves the just assigned lender appearance to the bottom of wheel LR. Table 9 shows the adjusted wheel LR.

TABLE 9

| wheel | pseudo-random no. | ordered sequence of participant appearances |
|---|---|---|
| LR | 7143256 | (L3c L1a L2c L2b L2a L3a L3b) L1a L2c L2b L2a L3a L3b L3c |

Figure 9C:
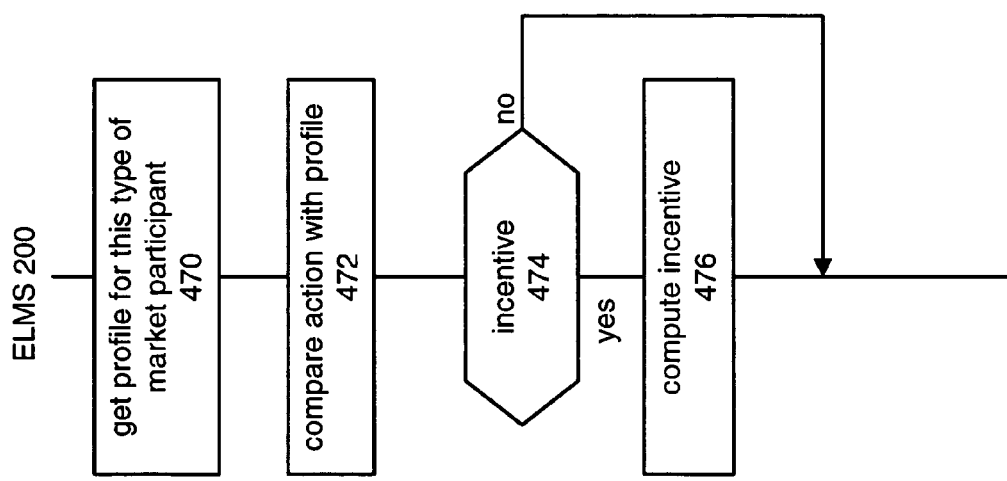

FIG. 9C provides detail for step 420 of FIG. 9A and step 520 of FIG. 10A.

At step 470, ELMS 200 gets the profile for this type of market participant in this tier.

At step 472, ELMS 200 compares the action with the profile to determine if the action is outside tier-normal behavior, that is, below the negative threshold or above the positive threshold. In some embodiments, negative incentives for early returns are not implemented as a matter of marketplace policy.

At step 474, ELMS 200 determines whether to provide an incentive. If the action is inside tier-normal behavior, then no incentive is provided and processing is complete.

If the action is outside tier-normal behavior, then at step 476, ELMS 200 computes a financial incentive.

An example of allocating a financial incentive is now discussed.

In this example, borrower CLP 241 returns 10,000 shares of XYZ having a price of $6 per share after two days. Assume incentive rates as set forth above in the discussion of FIG. 7.

At step 470, ELMS 200 gets profile BB of FIG. 6 as the proper profile, with a negative threshold set at seven days.

At step 472, ELMS 200 compares the action, a share return after two days, with the profile, having a negative threshold of seven days, to determine that the action is outside tier-normal behavior, that is, the share return was made abnormally soon after the stock loan was established.

At step 474, ELMS 200 determines whether to provide an incentive. Since the action is outside tier-normal behavior, the determination is positive.

At step 476, ELMS 200 computes a financial incentive. In this example,

Incentive=1 LoanValue*(SecondaryRate+MargIncentiveRate−PrimaryRate)/365, summed over the number of days that the loan is outstanding Incentive=(2 days)*(10,000 shares)*($6 per share)*(0.55%)/365

Incentive=$183

At step 425 of FIG. 9A, the borrower is debited by $183.

FIGS. 10A-10B are a flowchart showing automated incentives for a lender.

At step 500, PLP 230 initiates a share recall. At step 505, ELMS 200 receives the share recall.

At step 510, ELMS 200 allocates the share recall to a borrower, discussed below with regard to FIG. 10B. At step 515, EP 251 receives the share recall allocation. Since the share recall allocation is based on the ranking, this demonstrates why borrowers have an incentive to have a good ranking.

At step 520, ELMS 200 determines whether PLP 230 should be financially incentivized for this recall activity. In the case of a recall, a lender can earn only negative financial incentives for providing a too-early recall.

If, at step 520, it is determined that a financial incentive is not warranted, then processing is complete.

If, at step 520, it is determined that a negative financial incentive is warranted, then at step 525, the lender is debited by the disincentive amount, which may be calculated as a daily interest rate times shares recalled for a number of days that would make the recall be after a suitably long period, or the disincentive may be calculated according to another suitable procedure. At step 530, the borrower is credited by the disincentive amount. In some embodiments, step 530 is omitted and the funds are used according to a procedure beyond the scope of this document.

FIG. 10B provides detail for step 510 of FIG. 10A.

At step 550, ELMS 200 identifies borrowers who are eligible to accept a stock recall, that is, borrowers having loans of the stock symbol being recalled.

At step 551, ELMS 200 determines the portion to assign, in a manner similar to that discussed with respect to step 373 of FIG. 8C.

At step 552, ELMS 200 assigns the recall to the top borrower appearance on wheel BR that is eligible.

At step 554, ELMS 200 determines whether the stock recall has been fully assigned. If not, then at step 556, ELMS 200 gets the next eligible borrower appearance from wheel BR and assigns the recall, and processing returns to step 454.

At step 558, ELMS 200 moves the just assigned borrower appearances to the bottom of wheel BR.

Partial recalls are processed similarly.

An example of a stock recall using the wheel BR is now discussed.

Assume that lender L2 recalls 10,000 shares of XYZ.

At step 550, ELMS 200 identifies borrowers B1, B2, B4 as eligible to accept an XYZ stock recall as each of them has a stock loan of 5,000 shares of XYZ stock at the appropriate rate obtained through ELMS 200. Here, borrower B3 is ineligible as it is not borrowing shares of XYZ through ELMS 200.

At step 552, ELMS 200 assigns the return to the top borrower appearance on wheel BR that is eligible. As seen in Table 6, wheel BR has a sequence of: B4b B2a B4a B4c B3a. The first appearance is B4b, corresponding to borrower B4 who is eligible, so the 10,000 share recall from lender L2 is assigned to borrower B4.

At step 554, ELMS 200 determines that the stock return has not been fully assigned, since borrower B4 could accept a recall of only 5,000 shares, the maximum it has borrowed. So, at step 556, ELMS 200 gets the next appearance on wheel BR, namely, "B2a" corresponding to borrower B2 who is eligible. ELMS 200 assigns the remaining 10,000−5,000=5,000 shares to borrower B2.

At step 554, ELMS 200 determines that the stock return has been fully assigned.

At step 558, ELMS 200 moves the just assigned borrower appearances to the bottom of wheel BR. Table 10 shows the adjusted wheel BR.

TABLE 10

| wheel | pseudo-random no. | ordered sequence of participant appearances |
|---|---|---|
| BR | 41352 | (B4b B2a B4a B4c B3a) B4a B4c B3a B4b B2a |

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of responding to an event at a stock loan trading system used by borrowers and lenders, comprising:

automatically determining, by a computer program executing at the stock loan trading system, a positive borrower sequence of the borrowers, a positive lender sequence of the lenders, a negative borrower sequence of the borrowers, and a negative lender sequence of the lenders, based on activities of the borrowers and lenders during a first predetermined time period, receiving, by the computer program executing at the stock loan trading system, an event that is one of (i) a request for a new stock loan from one of the borrowers, (ii) an offer to loan stock from one of the lenders, (iii) a stock return from one of the borrowers, and (iv) a stock recall from one of the lenders, when the event is one of a request for a new stock loan request or a new stock loan offer,
 (1) adding, by the computer program executing at the stock loan trading system, the event to the next batch auction for the stock
 (2) during the next batch auction, sorting, by the computer program executing at the stock loan trading system, the stock loan requests and the stock loan offers according to price,
 (3) at each price, matching, by the computer program executing at the stock loan trading system, the stock loan requests and the stock loan offers according to the positive borrower sequence and the positive lender sequence so as to (a) fulfill the quantity for an initial borrower before going on to a next borrower, and (b) for each borrower, to fulfill the quantity for an initial lender before going on to a next lender, and
 (4) moving, by the computer program executing at the stock loan trading system, borrowers that participated in the matching to the end of the positive borrower sequence,
 (5) moving, by the computer program executing at the stock loan trading system, lenders that participated in the matching to the end of the positive lender sequence, when the event is a stock return,
 (6) allocating, by the computer program executing at the stock loan trading system, the stock return according to the negative lender sequence, and
 (7) moving, by the computer program executing at the stock loan trading system, lenders that participated in the stock return to the end of the negative lender sequence, when the event is a stock recall,
 (8) allocating, by the computer program executing at the stock loan trading system, the stock recall according to the negative borrower sequence, and
 (9) moving, by the computer program executing at the stock loan trading system, borrowers that participated in the stock recall to the end of the negative borrower sequence.

2. The method of claim 1, wherein the activities are one of loan durations, loan values, and share quantity in the loans.

3. The method of claim 2,
wherein each of the activities is compared, by the computer program executing at the stock loan trading system, with a low threshold and a high threshold, and
wherein an activity that is under the low threshold increases a frequency of the borrower's or lender's representation in the respective negative borrower sequence or negative lender sequence, and
wherein an activity that exceeds the high threshold increases a frequency of the borrower's or lender's representation in the respective positive borrower sequence or positive lender sequence.

4. The method of claim 1, further comprising:
for the batch auction, determining whether any of the participating borrowers or lenders are eligible for a financial incentive, and when the determination is positive, assigning, by the computer program executing at the stock loan trading system, the financial incentive to the eligible ones of the participating borrowers and lenders,
for the stock return, determining whether the borrower returning the stock is eligible for a financial incentive, and when the determination is positive, assigning, by the computer program executing at the stock loan trading system, the financial incentive to the returning borrower,
for the stock recall, determining whether the lender recalling the stock is eligible for a financial incentive, and when the determination is positive, assigning, by the computer program executing at the stock loan trading system, the financial incentive to the recalling lender.

\* \* \* \* \*